Figure 1:
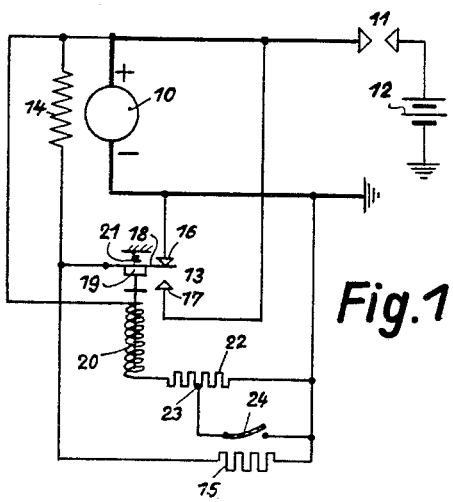

Dec. 11, 1956   H. MITTAG   2,774,029
VOLTAGE REGULATORS FOR DYNAMO-ELECTRIC MACHINES
Filed April 18, 1951

Inventor
Hermann Mittag
by
Stevens, Davis, Miller & Mosher
Attorneys nited States Patent Office 2,774,029
Patented Dec. 11, 1956

2,774,029
VOLTAGE REGULATORS FOR DYNAMO-ELECTRIC MACHINES

Hermann Mittag, Stuttgart-Botnang, Germany, assignor to Robert Bosch G. m. b. H., Stuttgart, Germany Application April 18, 1951, Serial No. 221,584

Claims priority, application Germany April 18, 1950

7 Claims. (Cl. 322—28)

The invention relates to a device for regulating the voltage of dynamos driven at variable speeds of rotation for charging a battery especially suitable for automobile installations, and having an electromagnetic trembler contact regulator and a heat sensitive member influencing directly the operation of the regulator.

Voltage regulator arrangements are known in which in the exciting current circuit of the regulator a heat sensitive snap or tumbler switch is arranged. This snap switch is so adjusted that it is dependent on the external temperature. It is further so adjusted that on the one hand it switches over the regulator only at an external temperature of about 30–40° C. for a regulation at lower voltage, on the other only at about a temperature of 0—5° C. again switches over for a regulation at the high voltage. Such apparatus does not however adjust the regulator system in the desired degree to the practical requirements regarding the charging of a battery.

An object of the invention is on the one hand to obtain a satisfactory charging of the battery under all operational conditions and on the other hand to avoid an over charging thereof.

According to the invention the member controlling the operation of the regulator is heated, by the regulating resistance of the exciter current circuit of the current generator.

In the drawing are shown three examples of construction of the object of the invention. These show:

Fig. 1 the circuit diagram of a plant with a voltage regulator and a bimetallic switch affecting the ampere winding member thereof.

Figure 2:
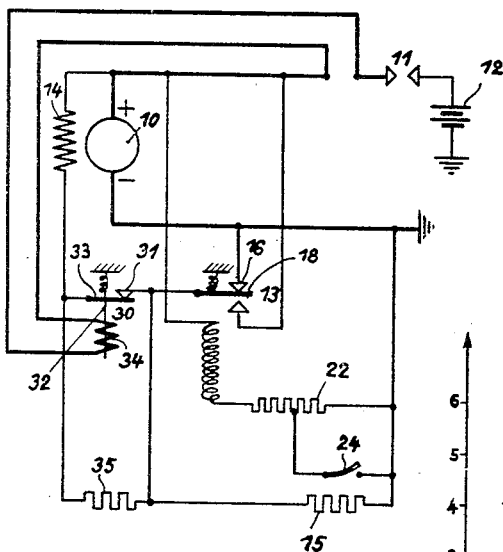

Fig. 2 the circuit of the same plant with an additional current regulator.

Figure 3:
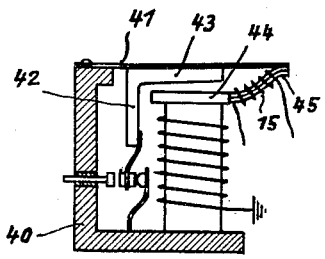

Fig. 3 a voltage regulator with a stop consisting of a bimetallic element controlling the return force of the regulator armature.

Figure 4:
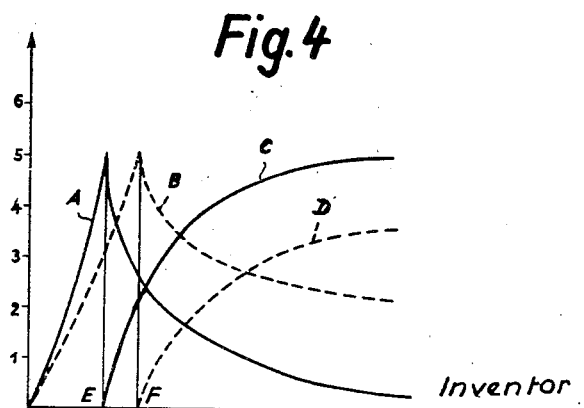

Fig. 4 a diagram showing the values of the exciter current of the current generator and the voltage at the terminals of the regulator resistance in dependence on the speed of rotation and load of the dynamo.

In Fig. 1, 10 denotes a shunt circuited direct current dynamo the positive pole of which is connected with a battery 12 through an automatic switch 11, while the negative pole of the dynamo is connected to earth. A trembler contact regulator 13 regulates the voltage of the dynamo in known manner and is able to periodically put in circuit a resistance 15 in front of the exciter coil 14 or to short circuit it. The regulator 13 has for this purpose two stationary contacts 16 and 17, between which lies the contact arm 18 of the regulator armature 19 which is actuated by an exciter coil 20 against the pull of a spring 21 which seeks to press the contact arm against the stationary contact 16. One end of the winding 20 is connected to the positive pole of the dynamo while the other end is connected to earth through a resistance 22. At a certain position e. g. at 23 a bimetallic switch 24 is connected to the resistance which can connect this part of the resistance to earth. The bimetallic switch is arranged adjacent to the regulating resistance 15 so that the switch is dependent on the temperature of the resistance which may also be wound on the bimetallic strip of the switch. The bimetallic switch is of such nature that in the cold condition it is open and begins to close on heating. On closing the switch the part of the resistance 22 lying between the place of tapping 23 and earth is short circuited and therewith the total resistance of the current circuit of the regulator voltage coil is diminished.

The apparatus works in the following manner. Referring to the diagram of Fig. 4 the curve A shows the value of the exciter current on half load and the curve B that, on full load and actually in dependence on the speed of rotation of the dynamo. The curve C shows the value of the voltage reigning at the terminals of the regulating resistance 15 in dependence on the speed at half load and the curve D on full load. The exciter current increases at first with increasing speed to a maximum value which is reached at half load at the speed of rotation E and at full load is reached at the speed F.

At these speeds the regulator begins to work. The increasing exciter current falls with further increasing speed at half load substantially more rapidly than at full load. The result of this is that with increasing speed the voltage at the terminal of the regulator resistance 15 increases more slowly than at half load. In order to hold the voltage of the dynamo at a constant value, with a smaller loading of the dynamo naturally more exciter current must be provided, i. e. the regulator resistance 15 will be more often put in circuit in front of the exciter winding than under conditions of greater load. The heat output in the regulating resistance 15 increases as the square of the voltage across it. In the diagram the voltage at the resistance for example at 3000 R. P. M. is about 3.8 volts on half load whilst on full load it only amounts to about 1.9 volts. That is to say on half load the heat output of the resistance is four times as great as with full load. The bimetallic switch will be thus on full load correspondingly less heated than on half load and will be therefore during a definite period of time, if it closes at all, be closed for a much shorter time than on half load. That is to say the resistance 22 remains connected under full load for a correspondingly long period, in series with the regulator coil 20, so that the regulator regulates under increased voltage conditions.

The fundamental mode of operation of the voltage regulator 13 is known. There need be described here, only the influence of the bimetallic switch on the mode of operation of the regulator. By the closing of the bimetallic switch the part of the resistance 22 lying in series with the regulator, the voltage coil 20 lying between the tapping point 23 and earth will be short circuited. By this diminution of the resistance value there increases with a given voltage the ampere winding value of the regulator voltage coil 20 whereby the regulator regulates to a lower voltage until an equilibrium condition is again produced at the regulator. By a suitable choice and proportioning of the bimetallic switch and the adjustment of the regulator, the whole apparatus can be adjusted completely to the requirement of practical operation. In a plant with six volts operating voltage, for example the regulator will be so adjusted that it regulates before the response of the bimetallic switch to eight volts and after its action reduces the voltage by one volt. Furthermore the bimetallic switch will be so adjusted that it closes at a heat output of the regulator resistance which is produced at full load and at 4000 revolutions per minute of the dynamo that is to say when the voltage at the regulator resistance 15 amounts to about two and a half volts. Under all operating conditions at which the voltage at the resistance 15 remains below two and a half volts, the regulator will regulate to eight volts and effects a rapid charging of the battery.

The arrangement of the invention operates particularly favourably when driving an automobile fitted therewith in which the journey must be often interrupted at street crossings, where mostly only short distances are traversed and the starter must be frequently put into operation. With such driving on the one hand the current consumption is large, on the other hand the charging conditions are unfavourable. In the short driving periods the bimetallic switch rarely attains the temperature which is necessary for closing the switch. Therefore the dynamo is continuously regulated to the higher voltage and the battery during the short driving periods is strongly charged. On country journeys on the other hand the dynamo runs mostly at its normal speed of rotation in which even at full load the voltage at the regulator resistance 15 lies above two and a half volts and thus the bimetallic switch is continuously closed.

The external temperature effects the regulating device in such a manner that in cold weather the heat output for actuation of the bimetallic switch must be greater i. e. the voltage at the regulation resistance 15 increases to about three volts in order to close the bimetallic switch. It follows however from the diagram that for instance under full load, the device operates with increased voltage. In hot weather however the heat output will be attained even with a lower voltage for instance two and a fifth volts and thereby an overcharging of the accumulator is avoided.

In the above described example only one voltage regulator is present. A still better adjustment to conditions occurring in practice can be obtained if in addition to the voltage regulator in known manner a further current regulator is used and as with the first described example, the voltage regulator is affected by the heat sensitive member heated by the aid of the regulator resistance. In Fig. 2 such a regulator device is shown. In this figure, the same reference numbers are used for the same parts corresponding to those of the first example. This regulating device differs from that shown in Fig. 1 only in that between the voltage regulator 13 and the exciter winding 14 of the dynamo a further current regulator 30 is inserted. This has a stationary contact 31 which is connected with the movable armature contact 18 of the voltage regulator. With the contact 31 co-operates a contact 33 fitted on the armature 22. The current regulator is excited by coil 34 which is connected in the positive lead between dynamo and battery. A regulator resistance 35 is inserted parallel to the contacts of the current regulator. The current regulator begins to function when the current delivered from the dynamo exceeds a predetermined value. Since the contacts of the voltage regulator and of the current regulator are arranged in series, the voltage regulator will be in known manner put out of action when the current begins to function. If the accumulator is fully discharged or only weakly charged, the current regulator begins to function immediately after it commences to be driven since the charging voltage is low and therefore the charging current high. The battery will be thus charged with a strong current. As long as the current regulator works, the voltage regulator is out of action that is to say the contact 18 remains in contact with the contact 16. In this position the regulator resistance 15 is short circuited and thus without current. The bimetallic switch 24 thus remains open and therewith the voltage regulator remains in the condition in which it regulates to a high voltage. Until the voltage regulator commences to operate, the battery must therefore be charged at the increased voltage at which regulator begins first to operate. The battery will thus on use of such a regulation device be very quickly charged. As soon as the charging voltage of the accumulator has attained the value at which the current regulator begins to operate and current begins to flow through the resistance 15 the bimetallic switch will be heated. After sufficient heating, which takes a certain time, a part of the resistance 22 is short circuited whereby the regulator regulates at a lower voltage value.

In the previously described examples a bimetallic switch is used to regulate the voltage regulator. Instead of this, a resistance with high negative temperature coefficient can be inserted also in parallel to the resistance 22, of which the specific resistance rapidly decreases with increasing temperature. Also the resistance 22 itself can consist of a substance having a high negative temperature coefficient.

A further method of controlling the voltage regulator according to the invention consists in mechanically operating directly on the regulator armature. In Fig. 3 an example is shown of such an arrangement. It shows a voltage regulator of usual construction with an angular shaped armature 42 suspended at the magnet frame 40 by means of a leaf spring 41 of which one limb 43 connected with the leaf spring stands over against the core 44 of the regulator at a predetermined distance in the position of rest. The leaf spring extends over the limb. Its free end lies on a stop 48 fastened to the magnet core which consists of a bimetallic element. On the bimetallic stop is wound wholly or partially, the regulating resistance lying in the current circuit of the exciter winding of the dynamo. The stop is so formed that it tensions more strongly the spring 41 in the cold condition, and the regulator is thus able to respond to a higher voltage than it would do in the heated condition of the said stop.

I claim:

1. A voltage output regulator for dynamo-electric machines driven at variable speeds, including in combination a current regulator, a voltage regulator, a regulating resistance in the exciter circuit of the dynamo-electric machine and controlled by the voltage regulator, a heat-sensitive member heated by said resistance, and means to control the voltage regulator from said heat-sensitive member.

2. A voltage output regulator for dynamo-electric machines driven at variable speeds, including in combination a current regulator, a voltage regulator, a regulating resistance in the exciter circuit of the dynamo-electric machine and controlled by the voltage regulator, a heat-sensitive member heated by said resistance, and means to control the armature of the voltage regulator from said heat-sensitive member.

3. A voltage output regulator for dynamo-electric machines driven at variable speeds, including in combination a current regulator, a voltage regulator, a regulating resistance in the exciter circuit of the dynamo-electric machine and controlled by the voltage regulator, a heat-sensitive member heated by said resistance, and means to control the armature restoring force of the voltage regulator from said heat-sensitive member.

4. A voltage output regulator for dynamo-electric machines driven at variable speeds, including in combination a current regulator, a voltage regulator, a regulating resistance in the exciter circuit of the dynamo-electric machine and controlled by the voltage regulator, a heat-sensitive member heated by said resistance, a bimetallic strip, means to heat said strip from the regulating resistance, a leaf spring mounted on the armature of the voltage regulator, and a stop projection for said leaf spring on said bimetallic strip.

5. A voltage output regulator for dynamo-electric machines having an exciter circuit and being driven at variable speeds, comprising an electromagnetic trembler contact regulator, a regulating resistance in the exciter circuit of the dynamo-electric machine and controlled by the regulator and means responsive solely to heat from said regulating resistance controlling the operation of said regulator.

6. A voltage output regulator for dynamo-electric machines having an exciter circuit and being driven at variable speeds, comprising an electromagnetic trembler contact regulator, a regulating resistance in the exciter circuit of the dynamo-electric machine and controlled by the regulator and a heat-sensitive member arranged adjacent said resistance and responsive solely to heat therefrom for controlling the operation of said regulator.

7. A voltage output regulator for dynamo-electric machines having an exciter circuit and being driven at variable speeds comprising an electromagnetic trembler contact regulator controlling the voltage of the machine, a regulating resistance in the exciter circuit and controlled by the regulator, a resistance in series with the regulator and means directly controlled by the regulating resistance for short circuiting a part of the resistance in series with the regulator.

References Cited in the file of this patent

UNITED STATES PATENTS

| | | |
|---|---|---|
| Re. 18,516 | Beetem | July 12, 1932 |
| 1,260,649 | Conard | Mar. 26, 1918 |
| 1,856,050 | Doman | Apr. 26, 1932 |
| 1,976,404 | Leingang | Oct. 9, 1934 |
| 2,244,307 | Menzel | June 3, 1941 |
| 2,427,440 | Buell | Sept. 16, 1947 |